US012738256B2

(12) United States Patent
Kobayashi et al.

(10) Patent No.: US 12,738,256 B2
(45) Date of Patent: Sep. 15, 2026

(54) SOUNDPROOFING COVER

(71) Applicant: KABUSHIKI KAISHA TOYOTA JIDOSHOKKI, Aichi (JP)

(72) Inventors: Toshiyuki Kobayashi, Aichi (JP); Noritaka Nishimori, Aichi (JP); Masaaki Matsushita, Aichi (JP); Toshiharu Awa, Aichi (JP); Ryuji Watanabe, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 202 days.

(21) Appl. No.: 18/602,480

(22) Filed: Mar. 12, 2024

(65) Prior Publication Data

US 2024/0331676 A1 Oct. 3, 2024

(30) Foreign Application Priority Data

Mar. 30, 2023 (JP) ................................ 2023-055992

(51) Int. Cl.
*G10K 11/162* (2006.01)
*B65D 43/16* (2006.01)
(Continued)

(52) U.S. Cl.
CPC ............ *G10K 11/162* (2013.01); *B65D 43/16* (2013.01); *B65D 43/22* (2013.01); *B65D 51/24* (2013.01);
(Continued)

(58) Field of Classification Search
CPC ...... G10K 11/162; B65D 43/16; B65D 43/22; B65D 51/24; B65D 2543/00194; B65D 2543/00351
See application file for complete search history.

(56) References Cited

U.S. PATENT DOCUMENTS 3,942,750 A * 3/1976 Noorily .................. H02G 3/266
248/74.3
4,507,828 A * 4/1985 Furutsu .............. B65D 63/1063
24/17 AP
(Continued)

FOREIGN PATENT DOCUMENTS

JP 2013-194673 9/2013
JP 2020205732 A * 12/2020
(Continued)

*Primary Examiner* — Forrest M Phillips
(74) *Attorney, Agent, or Firm* — Greenblum & Bernstein, P.L.C.

(57) ABSTRACT

A soundproofing cover includes a cover body configured to be opened and closed, and covering an attaching target when the cover body is in a closed state, a sound absorber disposed inside the cover body, and elastically deformable, an engaging member formed in the cover body, and an engaged member formed in the cover body, and with which the engaging member is to be engaged. The cover body is maintained in the closed state with the engaged member engaged with the engaging member. The soundproofing cover includes a restricting protrusion that protrudes inward from an inner surface of the cover body and restricts displacement of a portion of the cover body where the engaged member is formed toward an inside of the cover body with the restricting protrusion placed in contact with the attaching target in engaging the engaging member with the engaged member.

9 Claims, 4 Drawing Sheets

(51) Int. Cl.
*B65D 43/22* (2006.01)
*B65D 51/24* (2006.01)

(52) U.S. Cl.
CPC .............. *B65D 2543/00194* (2013.01); *B65D 2543/00351* (2013.01)

(56) References Cited

U.S. PATENT DOCUMENTS

| | | | | |
|---|---|---|---|---|
| 8,408,356 | B2 * | 4/2013 | Yamaguchi | H05K 7/20736 181/216 |
| 10,961,750 | B2 * | 3/2021 | Kondo | E05B 85/02 |
| 2006/0265840 | A1 * | 11/2006 | Thompson | H02G 3/30 24/16 PB |
| 2007/0101551 | A1 * | 5/2007 | Thompson | B65D 63/1072 24/16 PB |
| 2008/0271943 | A1 * | 11/2008 | Provessi | F04B 39/0072 181/212 |
| 2010/0331750 | A1 * | 12/2010 | Ingimundarson | A61F 5/0102 602/26 |
| 2022/0085688 | A1 * | 3/2022 | Riederer | B32B 27/32 |
| 2022/0267056 | A1 * | 8/2022 | Morris | B65D 43/164 |

FOREIGN PATENT DOCUMENTS

| | | |
|---|---|---|
| JP | 2021-170086 | 10/2021 |
| JP | 2022-169191 | 11/2022 |

* cited by examiner

SOUNDPROOFING COVER

CROSS-REFERENCE TO RELATED APPLICATION

This application claims priority to Japanese Patent Application No. 2023-055992 filed on Mar. 30, 2023, the entire disclosure of which is incorporated herein by reference.

BACKGROUND ART

The present disclosure relates to a soundproofing cover.

For example, Japanese Patent Application Publication No. 2022-169191 discloses a soundproofing cover that includes a cover body and a sound absorber. The cover body is configured to be opened and closed. The cover body covers an attaching target in a closed state. The sound absorber is disposed inside the cover body. The sound absorber is elastically deformable. The soundproofing cover includes an engaging member and an engaged member. The engaging member is provided in the cover body. The engaged member is provided in the cover body. The engaging member is configured to be engaged with the engaged member. Engaging the engaging member with the engaged member maintains the cover body in the closed state.

In this soundproofing cover, in engaging the engaging member with the engaged member, a force toward the inside of the cover body may be applied from the engaging member to the engaged member. In this case, a portion of the cover body where the engaged member is formed may be displaced toward the inside of the cover body due to the crushing of the sound absorber. If the portion of the cover body where the engaged member is formed is displaced toward the inside of the cover body, it may become difficult to engage the engaging member with the engaged member.

SUMMARY

In accordance with an aspect of the present disclosure, there is provided a soundproofing cover including a cover body configured to be opened and closed, and covering an attaching target when the cover body is in a closed state, a sound absorber disposed inside the cover body, and being elastically deformable, an engaging member formed in the cover body, and an engaged member formed in the cover body, and with which the engaging member is to be engaged, the cover body being maintained in the closed state with the engaged member engaged with the engaging member. The soundproofing cover includes a restricting protrusion that protrudes inward from an inner surface of the cover body and restricts displacement of a portion of the cover body where the engaged member is formed toward an inside of the cover body with the restricting protrusion placed in contact with the attaching target in engaging the engaging member with the engaged member

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe a soundproofing cover according to an embodiment with reference to FIGS. 1 to 6. The soundproofing cover of the present embodiment is attached to a compressor including a housing having a cylindrical shape. Therefore, an attaching target to which the soundproofing cover of the present embodiment is attached is the compressor.

Overall Configuration of Soundproofing Cover

Figure 1:
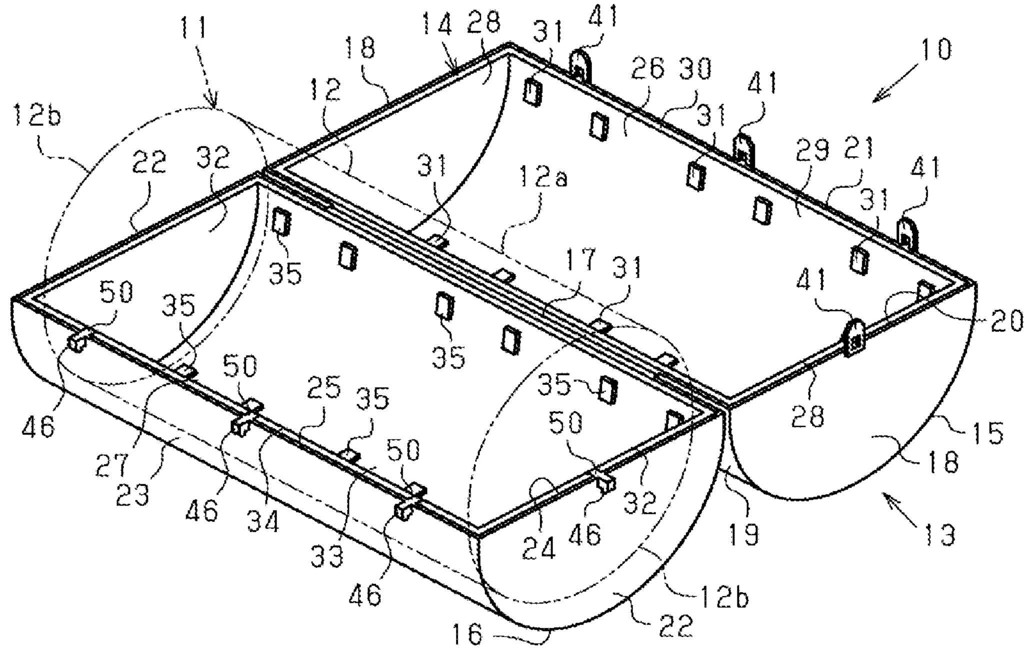
FIG. 1 is a perspective view illustrating a cover body in an opened state according to an embodiment.
Figure 2:
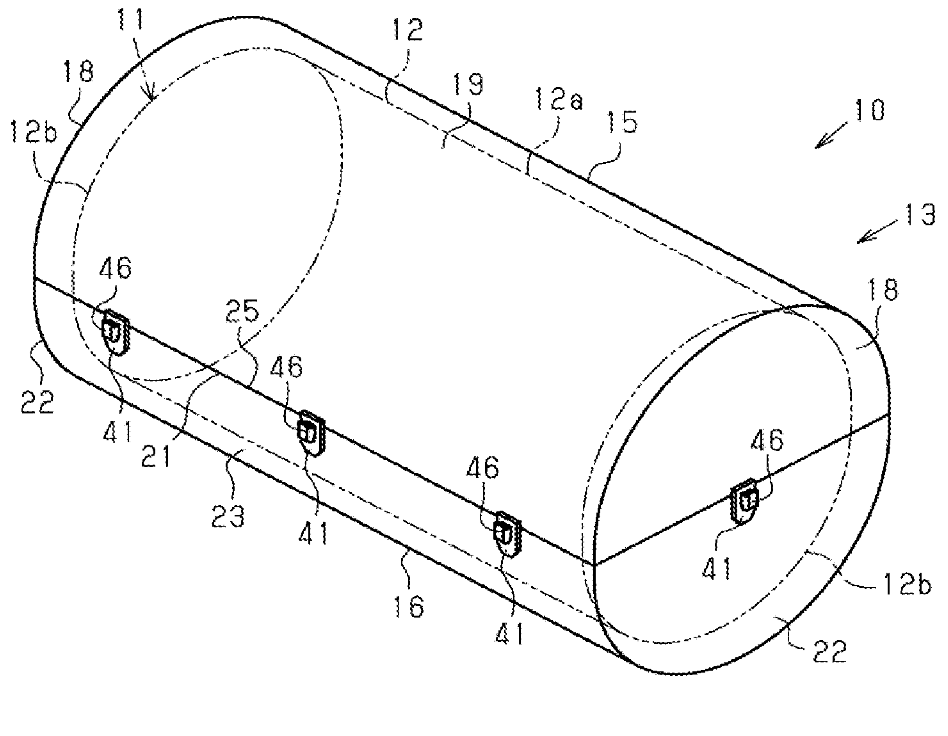
FIG. 2 is a perspective view illustrating the cover body in a closed state.

As illustrated in FIGS. 1 and 2, a soundproofing cover 10 is configured to cover a housing 12 of a compressor 11 entirely. The soundproofing cover 10 includes a cover body 13 and a sound absorber 14.

Cover Body

The cover body 13 is configured to be opened and closed. For example, synthetic resins such as polypropylene, polyamide, ABS resin, and olefin elastomer may be used as material for the cover body 13. The cover body 13 is made of material with excellent sound insulation properties. The cover body 13 has flexibility.

The cover body 13 includes a first cover forming member 15, a second cover forming member 16, and a hinge 17. The first cover forming member 15 has a semicylindrical shape. The first cover forming member 15 has a pair of first end walls 18 each having a semicircular disk shape and a first peripheral wall 19 having a semicylindrical shape. The first peripheral wall 19 connects the pair of first end walls 18 to each other. A first accommodation recess 20 is defined by the first peripheral wall 19 and the pair of first end walls 18. The edges of the first peripheral wall 19 and the edges of the first end walls 18 form a first opening edge 21 of the first cover forming member 15. The first opening edge 21 of the first cover forming member 15 forms an opening of the first accommodation recess 20. The first opening edge 21 of the first cover forming member 15 is a cover edge that corresponds to the opening edge of the cover body 13 when the cover body 13 is in an opened state. Thus, the cover body 13 has the first opening edge 21 corresponding to the cover edge.

When the cover body 13 is in the closed state, the first accommodation recess 20 accommodates a portion of the housing 12 of the compressor 11. The first cover forming member 15 is disposed relative to the housing 12 of the compressor 11 such that the first peripheral wall 19 covers a portion of the peripheral wall 12*a* of the housing 12 of the compressor 11, and the first end walls 18 covers portions of end walls 12*b* of the housing 12. The first peripheral wall 19 of the first cover forming member 15 extends along a circumferential direction of the housing 12 of the compressor 11.

A second cover forming member 16 has a semicylindrical shape. The second cover forming member 16 has a pair of second end walls 22 each having a semicircular disk shape and a second peripheral wall 23 having a semicylindrical shape. The second peripheral wall 23 connects the pair of second end walls 22 to each other. A second accommodation recess 24 is defined by the second peripheral wall 23 and the pair of second end walls 22. The edges of the second peripheral wall 23 and the edges of the second end walls 22 form a second opening edge 25 of the second cover forming member 16. The second opening edge 25 of the second cover forming member 16 forms an opening of the second accommodation recess 24. The second opening edge 25 of the second cover forming member 16 is a cover edge that corresponds to the opening edge of the cover body 13 when the cover body 13 is opened. Thus, the cover body 13 has the second opening edge 25 corresponding to the cover edge.

When the cover body 13 is in the closed state, the second accommodation recess 24 accommodates a remaining portion of the housing 12 of the compressor 11 that is not accommodated by the first accommodation recess 20. The second cover forming member 16 is disposed relative to the housing 12 of the compressor 11 such that the second peripheral wall 23 covers a remaining portion of the peripheral wall 12*a* of the housing 12 of the compressor 11 that is not covered by the first peripheral wall 19 of the first cover forming member 15. Thus, the second peripheral wall 23 of the second cover forming member 16 extends along the circumferential direction of the housing 12 of the compressor 11. The second cover forming member 16 is disposed relative to the housing 12 of the compressor 11 such that the second end walls 22 cover remaining portions of the end walls 12*b* of the housing 12 that are not covered by the first end walls 18 of the first cover forming member 15.

The hinge 17 connects the first cover forming member 15 and the second cover forming member 16. The hinge 17 connects one of the edges of the first peripheral wall 19 and one of the edges of the second peripheral wall 23. The hinge 17 is an integral hinge that is formed integrally with the first peripheral wall 19 of the first cover forming member 15 and the second peripheral wall 23 of the second cover forming member 16. Therefore, the hinge 17 is made of material the same as that of the cover body 13.

The hinge 17 is configured to allow the first cover forming member 15 and the second cover forming member 16 to rotate in directions in which the first opening edge 21 of the first cover forming member 15 and the second opening edge 25 of the second cover forming member 16 approach and separate from each other with the hinge 17 as a rotation center. The cover body 13 is brought into the closed state when the first opening edge 21 of the first cover forming member 15 and the second opening edge 25 of the second cover forming member 16 abut against each other. The cover body 13 covers the compressor 11 when the cover body 13 is in the closed state.

Sound Absorber

The sound absorber 14 is disposed inside the cover body 13. Thus, the sound absorber 14 is a part that is disposed inside the cover body 13. The sound absorber 14 is disposed between the cover body 13 and the housing 12 of the compressor 11. The sound absorber 14 is configured to cover the housing 12 of the compressor 11 entirely. Examples of material of the sound absorber 14 include urethane and nonwoven fabric. The sound absorber 14 is made of material with excellent sound absorbing properties. The sound absorber 14 is elastically deformable.

The sound absorber 14 includes a first sound absorber forming member 26 and a second sound absorber forming member 27. The first sound absorber forming member 26 has a semicylindrical shape. The first sound absorber forming member 26 has a pair of first end walls 28 each having a semicircular disk shape and a first peripheral wall 29 having a semicylindrical shape. The first peripheral wall 29 connects the pair of first end walls 28 to each other. The first sound absorber forming member 26 is disposed inside the first cover forming member 15.

The first end walls 28 of the first sound absorber forming member 26 extend along their associated inner surfaces of the first end walls 18 of the first cover forming member 15. The first end walls 28 of the first sound absorber forming member 26 cover their associated inner surfaces of the first end walls 18 of the first cover forming member 15 entirely. The first end walls 28 of the first sound absorber forming member 26 are in close contact with their associated inner surfaces of the first end walls 18 of the first cover forming member 15. The first peripheral wall 29 of the first sound absorber forming member 26 extends along an inner surface of the first peripheral wall 19 of the first coverforming member 15. The first peripheral wall 29 of the first sound absorber forming member 26 covers the inner surface of the first peripheral wall 19 of the first cover forming member 15 entirely. The first peripheral wall 29 of the first sound absorber forming member 26 is in close contact with the inner surface of the first peripheral wall 19 of the first cover forming member 15. A thickness of the first sound absorber forming member 26 in an original shape before elastic deformation is greater than a thickness of the first cover forming member 15.

The edges of the first peripheral wall 29 and the edges of the first end walls 28 form a first opening edge 30 of the first sound absorber forming member 26. The first opening edge 30 of the first sound absorber forming member 26 is flush with the first opening edge 21 of the first cover forming member 15.

The first sound absorber forming member 26 has a plurality of first ribs 31. The plurality of first ribs 31 protrude from the inner surface of the first peripheral wall 29 of the first sound absorber forming member 26. Each of the first ribs 31 is placed in contact with an outer peripheral surface of the housing 12 of the compressor 11, thereby supporting the first sound absorber forming member 26 relative to the housing 12 of the compressor 11. When the first sound absorber forming member 26 is in the original shape before the elastic deformation, the inner surface of the first peripheral wall 29 and the inner surfaces of the first end walls 28 of the first sound absorber forming member 26 are spaced from the housing 12 of the compressor 11.

The second sound absorber forming member 27 has a semicylindrical shape. The second sound absorber forming member 27 has a pair of second end walls 32 each having a semicircular disk shape and a second peripheral wall 33 having a semicylindrical shape. The second peripheral wall 33 connects the pair of second end walls 32 to each other. The second sound absorber forming member 27 is disposed inside the second cover forming member 16.

The second end walls 32 of the second sound absorber forming member 27 extend along their associated inner surfaces of the second end walls 22 of the second cover forming member 16. The second end walls 32 of the second sound absorber forming member 27 cover their associated inner surfaces of the second end walls 22 of the second cover forming member 16 entirely. The second end walls 32 of the second sound absorber forming member 27 are in close contact with their associated inner surfaces of the second end walls 22 of the second cover forming member 16. The second peripheral wall 33 of the second sound absorber forming member 27 extends along the inner surface of the second peripheral wall 23 of the second cover forming member 16. The second peripheral wall 33 of the second sound absorber forming member 27 covers the inner surface of the second peripheral wall 23 of the second cover forming member 16 entirely. The second peripheral wall 33 of the second sound absorber forming member 27 is in close contact with the inner surface of the second peripheral wall 23 of the second cover forming member 16. Thus, the sound absorber 14 is in close contact with the inner surface of the cover body 13. A thickness of the second sound absorber forming member 27 in an original shape before elastic deformation is greater than a thickness of the second cover forming member 16.

The edges of the second peripheral wall 33 and the edges of the second end walls 32 form a second opening edge 34 of the second sound absorber forming member 27. The second opening edge 34 of the second sound absorber forming member 27 is flush with the second opening edge 25 of the second cover forming member 16. When the cover body 13 is in the closed state, the first opening edge 30 of the first sound absorber forming member 26 and the second opening edge 34 of the second sound absorber forming member 27 abut against each other.

The second sound absorber forming member 27 has a plurality of second ribs 35. The plurality of second ribs 35 protrude from the inner surface of the second peripheral wall 33 of the second sound absorber forming member 27. Each of the second ribs 35 is placed in contact with the outer peripheral surface of the housing 12 of the compressor 11, thereby supporting the second sound absorber forming member 27 relative to the housing 12 of the compressor 11. When the second sound absorber forming member 27 is in the original shape before the elastic deformation, the inner surface of the second peripheral wall 33 and the inner surfaces of the second end walls 32 are spaced from the housing 12 of the compressor 11. Thus, when the sound absorber 14 is in an original shape before elastic deformation, a part of the sound absorber 14 other than the first ribs 31 and the second ribs 35 is spaced from the housing 12 of the compressor 11.

Engaging Member

The soundproofing cover 10 includes a plurality of engaging members 41. The engaging members 41 are formed in the first cover forming member 15. Thus, the engaging members 41 are formed in the cover body 13. The engaging members 41 are disposed in the other of the edges of the first peripheral wall 19 of the first cover forming member 15 different from the one of the edges of the first peripheral wall 19 to which the hinge 17 is connected, and an edge of one of the first end walls 18. The engaging members 41 each extend out from the outer surface of the first cover forming member 15 by a predetermined length beyond the first opening edge 21 of the first cover forming member 15. Thus, the engaging members 41 extend from the cover body 13. The engaging members 41 are formed integrally with the first cover forming member 15. Thus, the engaging members 41 are made of material the same as that of the cover body 13.

Figure 3:
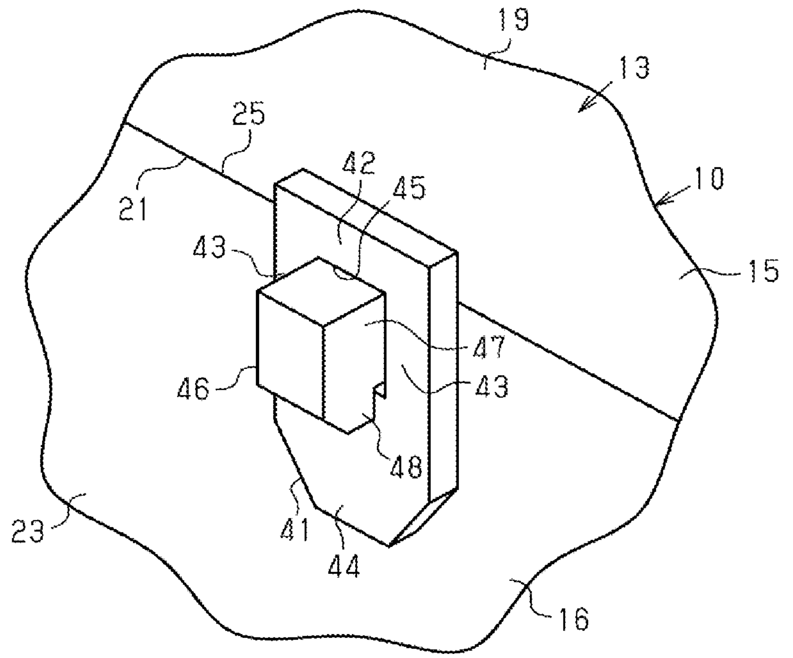
FIG. 3 is a perspective view illustrating a relationship between an engaging member and an engaged member.
Figure 4:
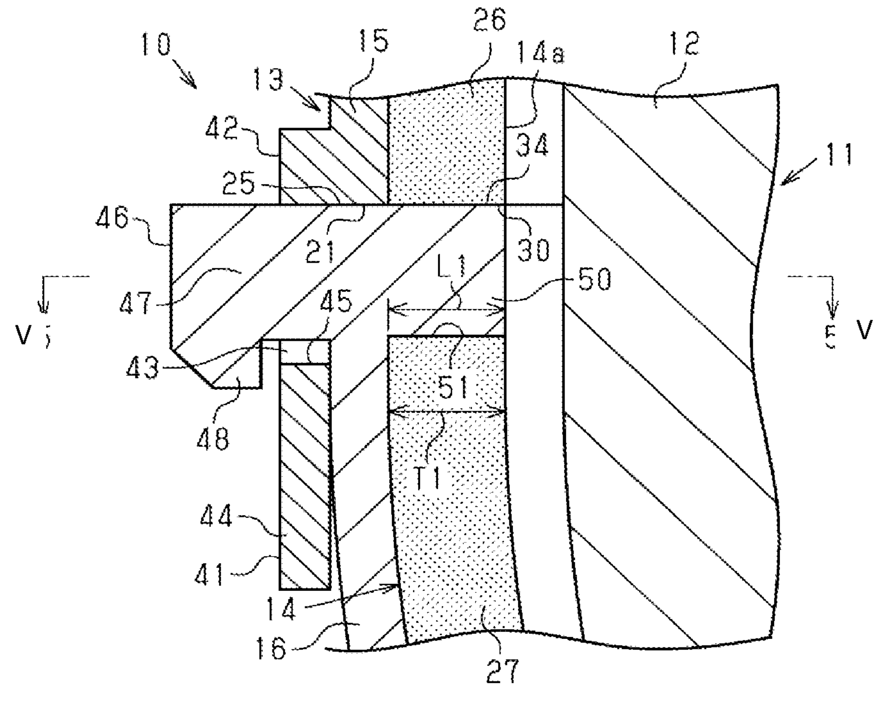
FIG. 4 is a cross-sectional view illustrating a relationship between a soundproofing cover and a compressor.

As illustrated in FIG. 3, the engaging members 41 each have a thin flat plate shape. The engaging members 41 each include a joining portion 42, a pair of connecting portions 43, and a grip portion 44. As illustrated in FIGS. 3 and 4, the joining portion 42 is joined to the outer surface of the first cover forming member 15. The joining portion 42 has an elongated plate shape. A longitudinal direction of the joining portion 42 coincides with an extending direction of the first opening edge 21 of the first cover forming member 15. A surface of the joining portion 42 on a side of the first opening edge 21 of the first cover forming member 15 is flush with the first opening edge 21.

The pair of connecting portions 43 each extend out by a predetermined length from opposite ends of the joining portion 42 in the longitudinal direction. The connecting portions 43 extend parallel to each other. The grip portion 44 connects ends of the connecting portions 43 opposite from the joining portion 42 to each other. The grip portion 44 has a tongue shape. The grip portion 44 forms a tip portion of each of the engaging members 41 in an extending direction thereof from the outer surface of the first cover forming member 15. Thus, an end of the grip portion 44 opposite from the connecting portions 43 is a tip end of each of the engaging members 41 in the extending direction. The joining portion 42, the pair of connecting portions 43, and the grip portion 44 form a hook hole 45. Thus, each of the engaging members 41 forms the hook hole 45. The hook hole 45 has a square hole shape.

Engaged Member

As illustrated in FIGS. 1 and 2, the soundproofing cover 10 includes a plurality of engaged members 46. The engaged members 46 are formed in the second cover forming member 16. Thus, the engaged members 46 are formed in the cover body 13. The engaged members 46 are disposed in the other of the edges of the second peripheral wall 23 of the second cover forming member 16 different from the one of the edges of the second peripheral wall 23 to which the hinge 17 is connected, and an edge of one of the second end walls 22. The engaged members 46 protrude from the outer surface of the cover body 13 at positions corresponding to the engaging members 41 when the cover body 13 is in the closed state. The engaged members 46 are formed integrally with the second cover forming member 16. Thus, the engaged members 46 are made of material the same as that of the cover body 13.

As illustrated in FIGS. 3 and 4, the engaged members 46 each include a protrusion body 47 and an engaging protrusion 48. The protrusion body 47 protrudes from the outer surface of the second cover forming member 16. Therefore, each of the engaged members 46 is a protrusion that protrudes from the outer surface of the cover body 13. The protrusion body 47 has a quadrangular column shape. The protrusion body 47 protrudes from a portion of the outer surface of the second cover forming member 16 continuous with the second opening edge 25. The engaging protrusion 48 protrudes from a tip portion of the protrusion body 47 in a direction opposite from the second opening edge 25 of the second cover forming member 16. Each of the engaged members 46 is a protrusion with a hooked tip portion.

Each of the engaging members 41 is hooked to its associated one of the engaged members 46 with each of the engaged members 46 inserted into the hook hole 45. In this way, each of the engaging members 41 is engaged with its associated one of the engaged members 46. Thus, the engaging members 41 are engaged with the engaged members 46.

As illustrated in FIG. 2, the cover body 13 is maintained in the closed state with the engaging members 41 engaged with the engaged members 46. As illustrated in FIGS. 3 and 4, in a state where each of the engaging members 41 is engaged with its associated one of the engaged members 46, the engaging protrusion 48 protrudes from the tip portion of the protrusion body 47 toward the tip end of its associated one of the engaging members 41 in the extending direction.

Restricting Protrusion

Figure 5:
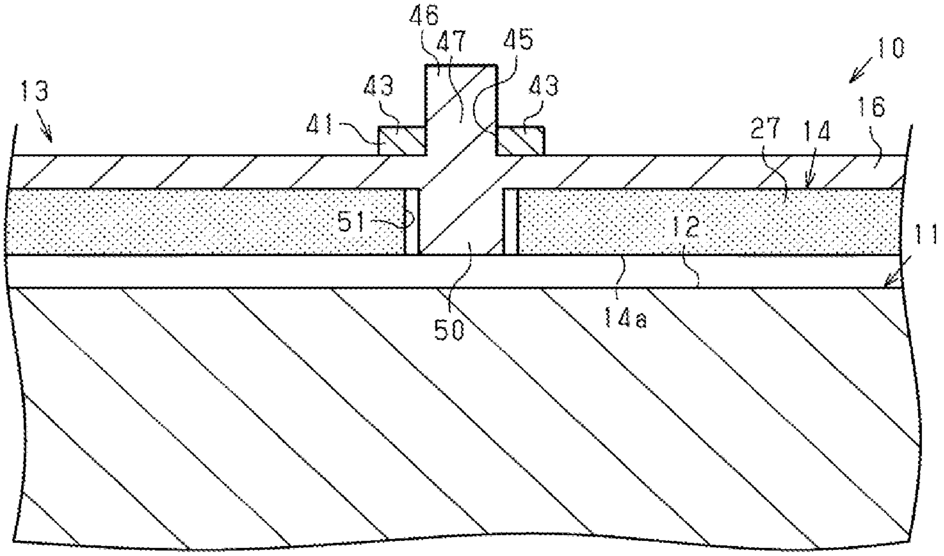
FIG. 5 is a cross-sectional view, taken along a line V-V of FIG. 4.

As illustrated in FIGS. 4 and 5, the soundproofing cover 10 includes restricting protrusions 50. The restricting protrusions 50 protrude inwardly from the inner surface of the second cover forming member 16. Thus, the restricting protrusions 50 protrude from the inner surface of the cover body 13. The restricting protrusions 50 protrude from the inner surface of the cover body 13 at positions that overlap with the engaged members 46 in a thickness direction of the cover body 13. Therefore, the soundproofing cover 10 has the same number of restricting protrusions 50 as the number of the engaged members 46. The restricting protrusions 50 each protrude from a portion of the inner surface of the second cover forming member 16 continuous with the second opening edge 25. The restricting protrusions 50 each have a quadrangular column shape, for example. The restricting protrusions 50 are formed integrally with the cover body 13.

The sound absorber 14 has insertion portions 51. The insertion portions 51 are formed in the second sound absorber forming member 27. The insertion portions 51 are formed in the second opening edge 34 of the second sound absorber forming member 27. The insertion portions 51 are recesses that are recessed from the second opening edge 34. The insertion portions 51 extend through the second sound absorber forming member 27 in the thickness direction thereof. The insertion portions 51 are formed in the second opening edge 34 of the second sound absorber forming member 27 at portions that overlap with the engaged members 46 in the thickness direction of the cover body 13. Thus, the soundproofing cover 10 includes the same number of insertion portions 51 as the number of the engaged members 46. The restricting protrusions 50 are insertable into the insertion portions 51. Thus, the restricting protrusions 50 are inserted into their associated insertion portions 51.

The restricting protrusions 50 protrude from the inner surface of the cover body 13 to a surface flush with the surface 14*a* of the sound absorber 14 on a side of the housing 12 of the compressor 11. Thus, a protrusion length L1 of each of the restricting protrusions 50 from the inner surface of the cover body 13 is equal to or greater than a half of a thickness T1 of the sound absorber 14 in the original shape before the elastic deformation. The restricting protrusions 50 are spaced from the housing 12 of the compressor 11 before the sound absorber 14 is elastically deformed.

Operation of Embodiment

The following will describe an operation of the embodiment.

Sound generated by driving the compressor 11 is radiated from the housing 12. At this time, the sound radiated from the housing 12 is absorbed by the sound absorber 14 of the soundproofing cover 10. In addition, the cover body 13 blocks the radiated sound having passed through the sound absorber 14. As a result, radiation of sound radiated from the housing 12 to the outside of the soundproofing cover 10 is suppressed.

Figure 6:
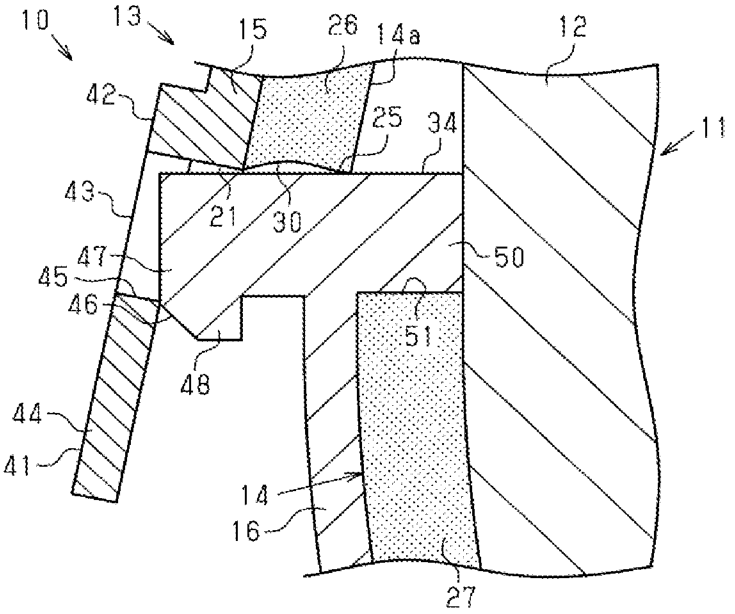
FIG. 6 is a cross-sectional view illustrating a state in which the engaging member is being engaged with the engaged member.

As illustrated in FIG. 6, for example, in engaging each of the engaging members 41 with its associated one of the engaged members 46, the engaged member 46 is inserted through the hook hole 45 while the grip portion 44 of the engaging member 41 is pulled. Then, the grip portion 44 of the engaging member 41 is disposed between the engaging protrusion 48 of the engaged member 46 and the outer surface of the second cover forming member 16. In this way, the engaging members 41 are engaged with the engaged members 46.

In this soundproofing cover 10, in engaging the engaging members 41 with the engaged members 46, a force toward the inside of the cover body 13 may be applied from the engaging members 41 to the engaged members 46. This may cause portions of the cover body 13 where the engaged members 46 are formed to be displaced toward the inside of the cover body 13 due to crushing of the second ribs 35 of the sound absorber 14. At this time, the restricting protrusions 50 are brought into contact with the housing 12 of the compressor 11. This restricts further displacement of the portions of the cover body 13 where the engaged members 46 are formed toward the inside of the cover body 13. Accordingly, the restricting protrusions 50 are placed in contact with the housing 12 of the compressor 11 in engaging the engaging members 41 with the engaged members 46, so that displacement of the portions of the cover body 13 where the engaged members 46 are formed toward the inside of the cover body 13 are restricted by the restricting protrusions 50. Since the displacement of the portions of the cover body 13 where the engaged members 46 are formed toward the inside of the cover body 13 is suppressed, the engaging members 41 are easily engaged with the engaged members 46.

Effects of Embodiment

The above embodiment offers the following effects.

(1) The soundproofing cover 10 includes the restricting protrusions 50 protruding inwardly from the inner surface of the cover body 13. The restricting protrusions 50 are configured to be placed in contact with the compressor 11 in engaging the engaging members 41 with the engaged members 46, so that the restricting protrusions 50 restrict the displacement of the portions of the cover body 13 where the engaged members 46 are formed toward the inside of the cover body 13. The restricting protrusions 50 placed in contact with the compressor 11 restrict the further displacement of the portions of the cover body 13 where the engaged members 46 are formed toward the inside of the cover body 13. Since the displacement of the portions of the cover body 13 where the engaged members 46 are formed toward the inside of the cover body 13 may be suppressed, the engaging members 41 may be easily engaged with the engaged members 46. As a result, engaging the engaging members 41 with the engaged members 46 may be made easy.

(2) The protrusion length L1 of each of the restricting protrusions 50 from the inner surface of the cover body 13 is equal to or greater than a half of the thickness T1 of the sound absorber 14 in the original shape before the elastic deformation. This configuration is suitable for suppressing the displacement of the portions of the cover body 13 where the engaged members 46 are formed toward the inside of the cover body 13.

(3) Since the restricting protrusions 50 protrude from the inner surface of the cover body 13 to the surface flush with the surface 14*a* of the sound absorber 14 on the side of the housing 12 of the compressor 11, the restricting protrusions 50 are easily placed in contact with the compressor 11. As a result, the displacement of the portions of the cover body 13 where the engaged members 46 are formed toward the inside of the cover body 13 may be easily suppressed.

(4) The restricting protrusions 50 protrude from the inner surface of the cover body 13 at the positions that overlap with the engaged members 46 in the thickness direction of the cover body 13. This configuration is suitable for suppressing the displacement of the portions of the cover body 13 where the engaged members 46 are formed toward the inside of the cover body 13.

(5) The restricting protrusions 50 are spaced from the compressor 11 before the sound absorber 14 is elastically deformed. Accordingly, even when the restricting protrusions 50 protrude from the inner surface of the cover body 13, positioning of the restricting protrusions 50 spaced from the compressor 11 suppresses generation of contact sound due to contact between the restricting protrusions 50 and the compressor 11 during the operation of the compressor 11.

(6) Since the restricting protrusions 50 are inserted into their associated insertion portions 51, the movement of the second sound absorber forming member 27 relative to the second cover forming member 16 is restricted by the restricting protrusions 50. Therefore, the displacement of the second sound absorber forming member 27 relative to the second cover forming member 16 may be suppressed.

Modification

The above embodiment may be modified, as exemplified below. The above embodiment and the following modifications may be combined within a technically consistent range.

Figure 7:
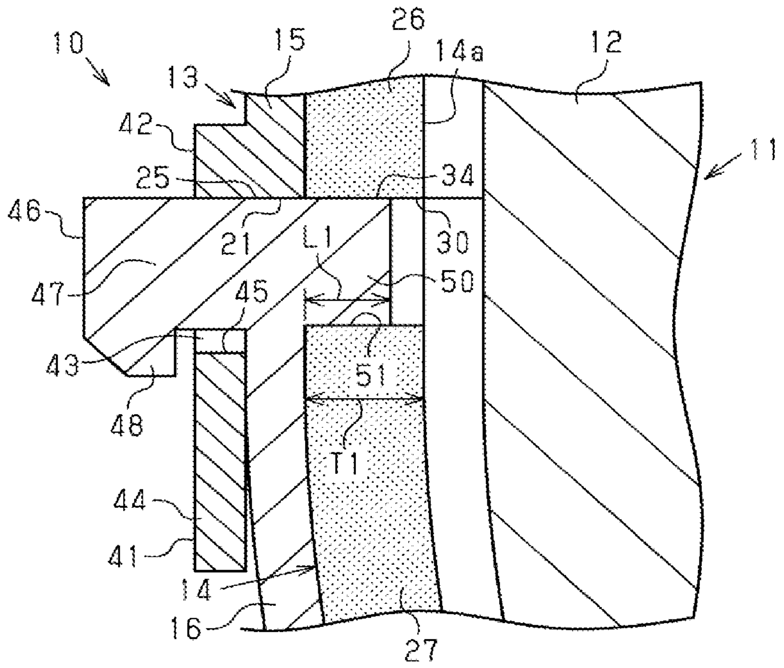
FIG. 7 is a cross-sectional view illustrating a relationship between a soundproofing cover and a compressor according to a modification.

As illustrated in FIG. 7, the restricting protrusions 50 may protrude from the inner surface of the cover body 13 to positions closer to the inner surface of the cover body 13 than the surface 14*a* of the sound absorber 14 positioned on the compressor 11 side. In an embodiment illustrated in FIG. 7, the protrusion length L1 of each of the restricting protrusions 50 from the inner surface of the cover body 13 is equal to or greater than a half of a thickness T1 of the sound absorber 14 in the original shape before the elastic deformation. This may suppress the displacement of the portions of the cover body 13 where the engaged members 46 are formed toward the inside of the cover body 13 while suppressing unintended contact of the restricting protrusions 50 with the compressor 11.

In an embodiment, the protrusion length L1 of each of the restricting protrusions 50 from the inner surface of the cover body 13 may be a half of the thickness T1 of the sound absorber 14 in the original shape before the elastic deformation.

In an embodiment, the protrusion length L1 of each of the restricting protrusions 50 from the inner surface of the cover body 13 may be equal to or less than a half of the thickness T1 of the sound absorber 14 in the original shape before the elastic deformation.

In an embodiment, the restricting protrusions 50 may protrude from the inner surface of the cover body 13 at positions shifted from the positions overlapping with the engaged members 46 in the thickness direction of the cover body 13.

In an embodiment, the restricting protrusions 50 may be in contact with the compressor 11 before the sound absorber 14 is elastically deformed.

In an embodiment, the restricting protrusions 50 do not have to be integrally formed with the cover body 13, but may be parts separately provided from the cover body 13. In short, the restricting protrusions 50 only have to protrude inward from the inner surface of the cover body 13. That is, the restricting protrusions 50 may be configured to restrict the displacement of the portions of the cover body 13 where the engaged members 46 are formed toward the inside of the cover body 13 with the restricting protrusions 50 in contact with the compressor 11 in engaging the engaging members 41 with the engaged members 46.

Although the restricting protrusions 50 each have a quadrangular column shape as an example in the above embodiment, the shape of the restricting protrusions 50 is not particularly limited to such a shape.

In an embodiment, for example, the engaging members 41 each may be a protrusion and the engaged members 46 each may be a part that defines the hook hole 45. In short, the relationship between the concavity and convexity of the engaging members 41 and the engaged members 46 is not particularly limited.

In an embodiment, the sound absorber 14 may be in close contact with the housing 12 of the compressor 11 when the sound absorber 14 is in the original shape before the elastic deformation.

In an embodiment, the number of the engaging members 41 may be changed, as necessary. In this case, the number of the engaged members 46 is appropriately changed so as to correspond to the number of the engaging members 41. In short, the engaged members 46 only have to be provided in the outer surface of the cover body 13 at positions corresponding to the engaging members 41 when the cover body 13 is in the closed state.

In an embodiment, the cover body 13 does not have to include the hinge 17. In such a case, the soundproofing cover 10 may have a structure, for example, in which the first cover forming member 15 and the second cover forming member 16, both having a semicylindrical shape, are combined. The soundproofing cover 10 may have a structure in which the cover body 13 of a single strip of a thin sheet is wound around the housing 12 of the compressor 11 all the way around to cover the housing 12. In short, the soundproofing cover 10 only has to be a cover in which the cover body 13 is configured to be opened and closed and the cover body 13 is maintained in the closed state with the engaging members 41 engaged with the engaged members 46.

Although the soundproofing cover 10 is attached to the compressor 11 including the housing 12 having a cylindrical shape in the embodiment, an attaching target to which the soundproofing cover 10 is attached is not particularly limited.

The above embodiment includes the configuration described in the following additional notes.

Additional Note 1

A soundproofing cover comprising:

a cover body configured to be opened and closed, and covering an attaching target when the cover body is in a closed state;

a sound absorber disposed inside the cover body, and elastically deformable;

an engaging member formed in the cover body; and an engaged member formed in the cover body, and with which the engaging member is to be engaged, the cover body being maintained in the closed state with the engaged member engaged with the engaging member, wherein the soundproofing cover includes a restricting protrusion that protrudes inward from an inner surface of the cover body and restricts displacement of a portion of the cover body where the engaged member is formed toward an inside of the cover body with the restricting protrusion placed in contact with the attaching target in engaging the engaging member with the engaged member.

Additional Note 2

The soundproofing cover according to [Additional note 1], wherein the sound absorber is in close contact with the inner surface of the cover body, and a protrusion length of the restricting protrusion from the inner surface of the cover body is a half of or greater than a thickness of the sound absorber in an original shape before elastic deformation.

Additional Note 3

The soundproofing cover according to [Additional note 2], wherein the restricting protrusion protrudes from the inner surface of the cover body to a surface flush with a surface of the sound absorber on the attaching target side.

Additional Note 4

The soundproofing cover according to [Additional note 2], wherein the restricting protrusion protrude from the inner surface of the cover body to a position closer to the inner surface of the cover body than the surface of the sound absorber 14 on the attaching target side.

Additional Note 5

The soundproofing cover according to any one of [Additional note 1] to [Additional Note 4], wherein the restricting protrusion protrudes from the inner surface of the cover body at a position that overlaps with the engaged member in a thickness direction of the cover body.

Additional Note 6

The soundproofing cover according to [Additional note 1] to [Additional note 5], wherein the restricting protrusion is spaced from the attaching target when the sound absorber is in an original shape before elastic deformation.

What is claimed is:

1. A soundproofing cover comprising:

a cover body configured to be opened and closed, and covering an attaching target when the cover body is in a closed state;

a sound absorber disposed inside the cover body, and being elastically deformable;

an engaging member formed in the cover body; and an engaged member formed in the cover body, and with which the engaging member is to be engaged, the cover body being maintained in the closed state with the engaged member engaged with the engaging member, wherein the soundproofing cover includes a restricting protrusion that protrudes inward from an inner surface of the cover body, the restricting portion includes a contact surface in contact with the attaching target, and restricts displacement of a portion of the cover body where the engaged member is formed toward an inside of the cover body with the contact surface of the restricting protrusion placed in contact with the attaching target in engaging the engaging member with the engaged member.

2. The soundproofing cover according to claim 1, wherein the sound absorber is in close contact with the inner surface of the cover body, and a protrusion length of the restricting protrusion from the inner surface of the cover body is equal to or greater than a half of a thickness of the sound absorber in an original shape before elastic deformation.

3. The soundproofing cover according to claim 2, wherein the restricting protrusion protrudes from the inner surface of the cover body to a surface flush with a surface of the sound absorber on a side of the attaching target.

4. The soundproofing cover according to claim 2, wherein the restricting protrusion protrudes from the inner surface of the cover body to a position closer to the inner surface of the cover body than the surface of the sound absorber on the attaching target side.

5. The soundproofing cover according to claim 1, wherein the restricting protrusion protrudes from the inner surface of the cover body at a position that overlaps with the engaged member in a thickness direction of the cover body.

6. The soundproofing cover according to claim 1, wherein the restricting protrusion is spaced from the attaching target when the sound absorber is in an original shape before elastic deformation.

7. The soundproof cover according to claim 1, wherein the contact surface of the restricting protrusion faces away from the engaged member and the inner surface of the cover body.

8. The soundproof cover according to claim 7, wherein the restricting protrusion has a columnar shape, and an area of the contact surface of the restricting protrusion is substantially the same as an area of the restricting protrusion connecting the inner surface of the cover body.

9. The soundproof cover according to claim 7, wherein the engaged member includes a protrusion protruding outward from the outer surface of the cover body in the thickness direction of the cover body, the restricting protrusion protrudes inwardly from the inner surface of the cover body at a position that overlaps with the protrusion of the engaged member in the thickness direction of the cover body, and an area of the engaged portion connecting the outer surface of the cover body is smaller than an area of the restricting protrusion connecting the inner surface of the cover body.

* * * * *